UNITED STATES PATENT OFFICE.

BEN D. ATWELL AND MISS G. H. CRAWFORD, OF PORTAGE CITY, WIS.

IMPROVED MODE OF KEEPING EGGS.

Specification forming part of Letters Patent No. 65,988, dated June 25, 1867.

*To all whom it may concern:*

Be it known that we, BEN D. ATWELL and Miss G. H. CRAWFORD, of Portage City, in the county of Columbia, in the State of Wisconsin, have invented a new and improved mode of keeping eggs fresh and sound the year round; and we do hereby declare that the following is a full and exact description thereof, reference being had to the accompanying recipe.

The nature of our invention consists in the following proportions: To make a gallon of the preserving-fluid, take two ounces white glue, one ounce isinglass, soaked over night in one (1) quart of cold water; then simmer over a slow fire until dissolved. In three (3) quarts of water dissolve one (1) ounce unslaked lime, and add two (2) table-spoonfuls of corn-starch. Now boil the whole together, and, while boiling, dip the eggs in and hold them there from five to ten seconds. Then lay them out and let them dry. A wire dipper should be used. The eggs should be kept separate until dry, or they will stick together. After drying they are all right, and can be kept in any convenient thing or place.

What we claim as our invention, and desire to secure by Letters Patent, is—

The application of the above recipe for preserving eggs, as herein described, using for that purpose the aforesaid ingredients, or any other substantially the same, and which will produce the intended effect.

BEN D. ATWELL.
Miss G. H. CRAWFORD.

Witnesses:
ANDREW CRAWFORD,
C. A. DIBBLE.